US006711977B2

(12) United States Patent
Tsai

(10) Patent No.: US 6,711,977 B2
(45) Date of Patent: Mar. 30, 2004

(54) PORTABLE PLATE CIRCULAR ARC PUNCH SHEAR STRUCTURE

(76) Inventor: Po Jen Tsai, P.O. Box 82-144, Taipei (TW)

( * ) Notice: Subject to any disclaimer, the term of this patent is extended or adjusted under 35 U.S.C. 154(b) by 243 days.

(21) Appl. No.: 09/938,557

(22) Filed: Aug. 27, 2001

(65) Prior Publication Data

US 2003/0037652 A1 Feb. 27, 2003

(51) Int. Cl.[7] .................................................. B32B 31/00
(52) U.S. Cl. ............................ 83/167; 83/686; 156/518
(58) Field of Search ........................ 83/167, 588, 452.9, 83/821, 635, 582, 452, 686, 917, 140, 684, 679; 156/518, 252, 261, 520, 513, 96

(56) References Cited

U.S. PATENT DOCUMENTS 2,260,183 A * 10/1941 Leslie ......................... 83/628
3,028,795 A * 4/1962 Hughes ...................... 493/375
3,277,022 A * 10/1966 Evans et al. ................ 525/410
4,310,379 A * 1/1982 Harrison ..................... 156/541
4,708,042 A * 11/1987 Jung ........................... 83/112
4,826,561 A * 5/1989 Carroll ....................... 156/518
5,410,928 A * 5/1995 Bakermans et al. .......... 83/155

* cited by examiner

*Primary Examiner*—Allan N. Shoap
*Assistant Examiner*—Ghassem Alie
(74) *Attorney, Agent, or Firm*—Leong C. Lei

(57) ABSTRACT

An improved structure for a portable plate circular arc punch shear which has a driver to activate a press plate for leverage pivoting with another end of the press plate to restrict a plunger for the plunger to push a punch shear dies unit in various shear arc provided on the peripheral of the dies unit. The circular arc punch shear is operated for a plate work piece by turning the punch shear dies unit to easily shift the radius of the arc area to be sheared while the main frame and related air pipe can be easily removed and modified to allow operation in portable and fixed modes in coping with requirements of individual process, thereby effectively expanding processing agility, and reducing costs of diversified production of smaller quantity.

1 Claim, 3 Drawing Sheets

PORTABLE PLATE CIRCULAR ARC PUNCH SHEAR STRUCTURE

BACKGROUND OF THE INVENTION (a) Field of the Invention

The present invention relates to an improved structure for a portable plate circular arc punch shear, and more particularly, to one that allows easy conversion of dies, improved agility and reduced costs of diversified production of smaller quantity.

(b) Description of the Prior Art

Conventionally, a punch is generally used to drive a die of circular arc shear in fixed dimension for plate circular arc shear. The die takes advantage of the power from the punch to complete the shear process. However, longer punch travel is required for the punch to adapt to other processing conditions, and one die is provided with a single punch dimension only. The fixed design of the die is more complicate, involving high production cost, and difficulties in assembly and dies replacement. Such structure of dies in fixed dimension driven by a punch is not ideal for diversified production of smaller quantity, therefore, is poor in production agility.

Furthermore, most of conventional presses or punches, disregarding its type or form are prevented from being portable, and the circular arc shear process for various types of plates requires to be done at a fixed site, resulting in the absence of convenience in their applications.

SUMMARY OF THE INVENTION

The primary purpose of the present invention is to provide an improved structure of a portable plate circular arc punch shear that allows easy conversion of dies, improved agility, and reduced cost of diversified production of smaller quantity. To attain the purpose, a driver connected to an external pneumatic system is provided to the punch shear and the driver is used to activate a press plate, which in turn, drives a punch shear die provided at its peripheral multiple shear arc areas depending on requirements of individual process.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
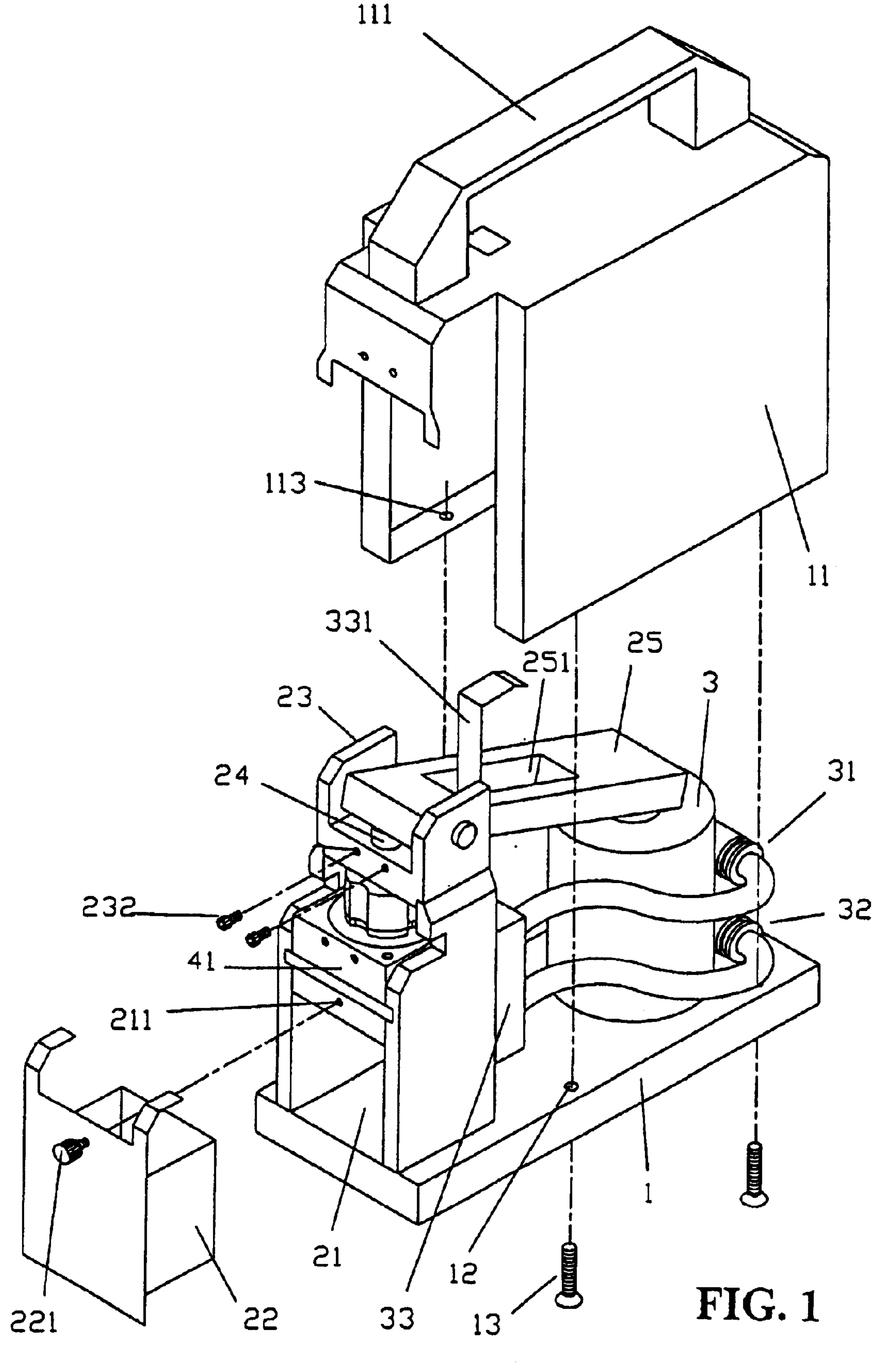
FIG. 1 is an exploded view of a preferred embodiment of the present invention.
Figure 2:
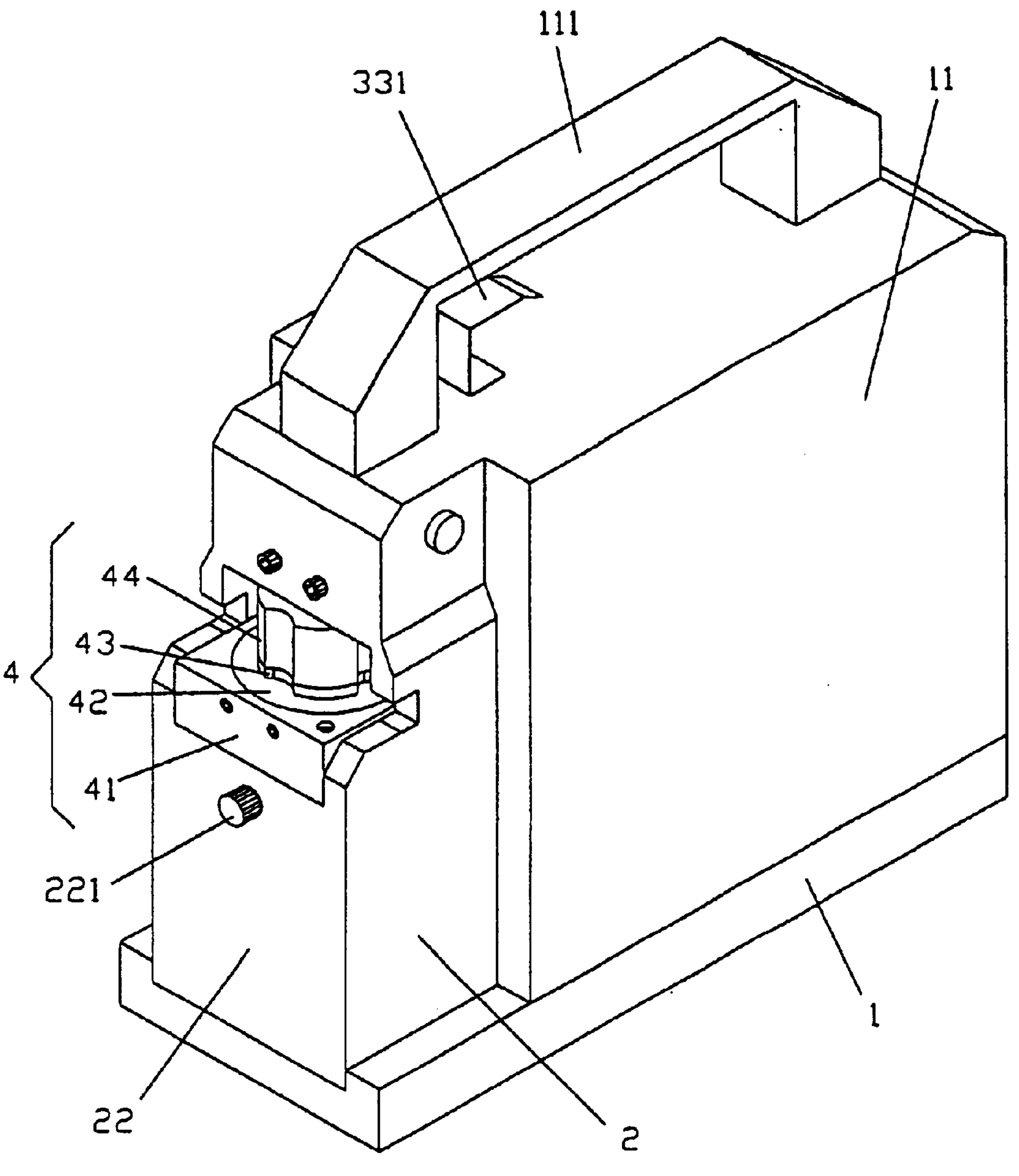
FIG. 2 illustrates the appearance of the preferred embodiment of the present invention.
Figure 3:
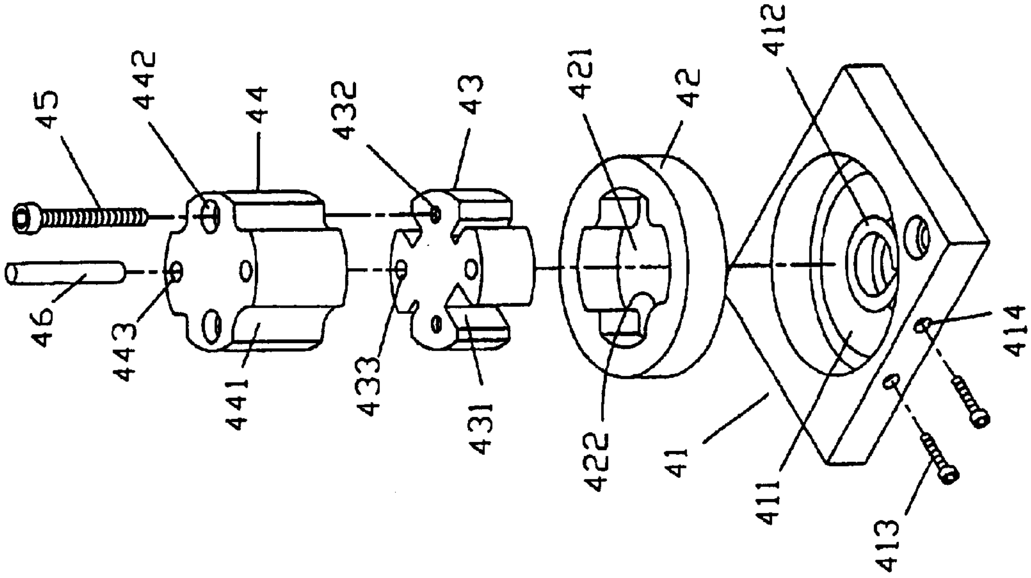
FIG. 3 is an exploded view of punch shear dies of the preferred embodiment of the present invention.
Figure 4:
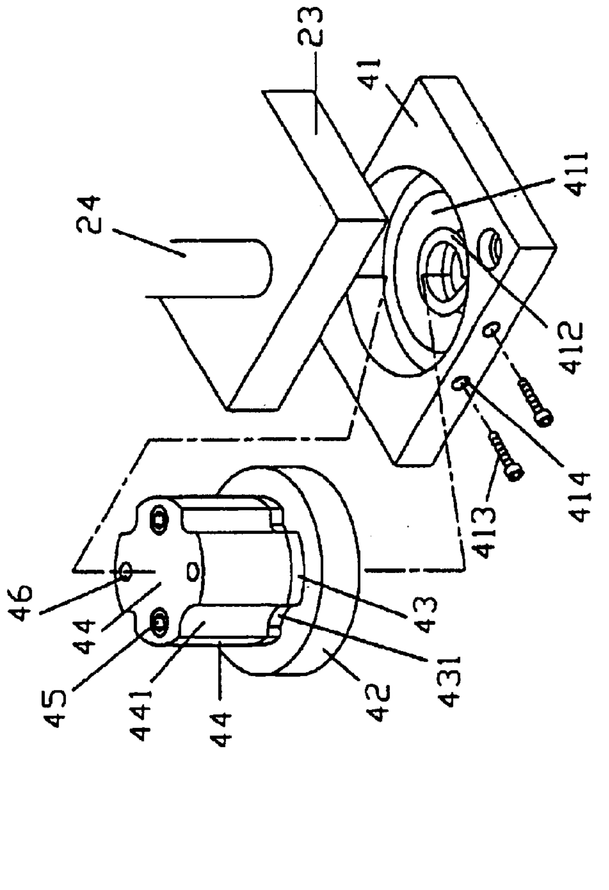
FIG. 4 is a view showing the structure of the punch shear dies assembly in relation to other parts of the preferred embodiment of the present invention.

Referring to FIGS. 1 through 4 of the accompanying drawings, a preferred embodiment of the present invention is essentially comprised of a main frame 1, a primary support 2, a driver 3, and a punch shear dies unit 4. The top of the main frame 1 is provided to accommodate other elements, and a housing 11 to cover the main frame 1. A handle 111 is provided on top of the housing 11, and multiple bores 12 are provided on the peripheral of the main frame 1 and matching screw eyes 113 are provided on the bottom of the housing 11. The primary support 2 provided at one end of the main frame 1 has at its bottom a space 21 to accommodate a waste collection bin 22. A screw eye 211 is provided on top of the accommodation space 21 to receive a fixing bolt 221 provided in relation to said screw eye 211 to fix the waste collection bin 22. A plunger holder 23 laterally provided on top of the primary support 2 has a plunger 24 vertically penetrating through the center of the plunger holder 23. A press plate 25 is pivotally mounted on the plunger holder 23. One end of the press plate 25 is restricted by said plunger 24 and the other end extending to the other side of the main frame 1. The middle section of the primary support 2 is to accommodate and secure the punch shear dies unit 4 in position. The driver 3 provided on the other side opposite to the primary support 2 of the main frame has its top protruding and holding against one end of the press plate 25, and has on its die provided with air connectors 31, 32 connected to an air control valve 33 via a air pipe. Operation of said air control valve 33 is controlled by pull 331 extending upward. When the pull 331 is pressed, the air valve 33 will drive the driver 3 to lift an end of the press plate 25 thereby depressing the lower end of the press plate 25 and therefore pushing down the upper die 44 to perform cutting operation. Said punch shear dies unit is essentially comprised of a die holder 41, a lower die 42, a guide post 43 and an upper die 44. An accommodation hole 411 is provided in the center of the die holder 41 to house the lower die 42, a return coil 412 is provided at the bottom inside the accommodation hole 411. Multiple screw eyes 414 extending into the accommodation hole 411 are provided by the die holder 41, and the circumference of the lower die 42 has the same shape of the accommodation hole 411, and a shear chute 421 is provided in the center of the lower die 42. Multiple convex shear arc areas 422 in various radii extending inwardly are provided on the circumference of shear chute. Said guide post 43 having the same shape of that for the shear chute 421 is provided on its circumference multiple dents 431 corresponding to those convex shear arc areas 422. Multiple screw eyes 432 and positioning pin holes 433 are provided on top of the guide post with matching fisheyes 442 and positioning pin holes 443 longitudinally penetrating through the upper die 44. Multiple concave shear arc areas 441 are provided on the circumference of the upper die 44 to relatively connect to said convex shear arc areas 422.

Upon assembling, a positioning pin 46 penetrates the positioning pin hole 443 and inserted into the positioning pin hole 433 while a upper die positioning bolt 45 penetrates the fisheye 442 and is secured in position in the screw eye 432 thus to incorporate the upper die 44 to the guide post 43, which in turn is placed inside the shear chute 421 in the lower die 42. Then the lower die 42 is placed inside the lower die accommodation hole 411 in the die holder 41, and secured in position by having a lower die positioning bolt 413 deposed in a screw hole 414 to hold against the lower die. Meanwhile, the base of the guide post is subject to the holding by the return coil 412, creating a gap reserved between the upper die 44 and the lower die 42 for being subject to the holding by the guide post 43. Since the top of the upper die 44 is also restricted by the plunger 24, the punch shear dies unit 4 is incorporated to the middle section of the primary support 2. Furthermore, by having multiple fixing bolts 13 to penetrate those screw eyes provided in the peripheral of the main frame 1 and secured in those screw eyes 113 in the housing 11, the housing 11 is incorporated to the main frame 1 and covers the main frame 1 on the press plate 25 and the driver 3. The control pull 331 controlling the air control valve 33 protrudes out of a pre-perforated area 112 on top of the housing 11 and extends to where below the handle 111.

In practical use, one end of a work piece of a plate pending punch shear is inserted into the dent 431 of the guide post 43 through the gap reserved between the upper die 44 and the lower die 42. Press the pull 331 to control the air control valve 33 to activate the driver 3, thus to push the press plate 25 on one end while the other end of the press plate 25 pressed down the plunger 24 for it to push against and causes the upper die to slide downward, and finally to shear the corner of a workpiece into a circular arc by means of those concave arc areas 441 from the upper die 44 in conjunction with those convex arc areas 422 from the lower die 42. Upon completing the shear, the control pull 331 is released to retract the driver 3 controlled by the air control valve, then the return coil 412 holds against the guide post 43 and the upper die 44 for the press plate 25 to return to its initial position.

In the preferred embodiment of the present invention as disclosed above, said air connectors 31, 32 are provided by said main frame 1 for easy mounting or dismounting the inherited air pipe for connecting an external control valve so to fix the main frame 1 on a holder to become a fixed type of tooling machine.

I claim:

1. An improved structure of a portable plate circular arc punch shear comprising:

a main frame;

a housing covering said main frame and having a plurality of screw eyes;

a handle provide on a top of said housing;

a primary support provided one side of the housing, said primary support having a bottom with a space for accommodating a waste collection bin, said waste collection bin having a screw eye to receive a fixing bolt so as to fix said waste collection bin to said primary support;

a plunger holder provided on a top of said primary support;

a plunger vertically penetrating through a center of said plunger holder;

a press plate pivotally mounted on said plunger holder;

a driver mounted on said main frame and having a top end drivingly connected with an end of said press plate;

an air valve mounted on said main frame and having a pull extending upwardly through said press plate, said air valve being connected to said driver via two connectors; and a punch shear dies unit mounted under said plunger holder on said primary support, said punch shear dies unit comprising a die holder, a lower die, a guide post and an upper die, said die holder having an accommodation hole, a return coil fitted in said accommodation hole, a plurality of holes extending through said die holder, said lower die having the same shape as said accommodation hole, a shear chute formed in a center of said lower die, multiple convex shear arc areas in various radii extending inwardly from an inner side of said shear chute, said guide post fitted in said shear chute of said lower die, multiple screw eyes and positioning pin holes being provided on a top of said guide post, said upper die being formed with fisheyes and positioning pin holes aligned with said screw eyes and positioning pin holes of said guide post, multiple concave shear arc areas formed on a circumference of said upper die;

whereby when said pull is pressed, said air valve will drive said driver to lift an end of said press plate thereby depressing a lower end of said press plate and therefore pushing down said upper die to perform cutting operation.

* * * * *